(12) United States Patent
Ishii et al.

(10) Patent No.: US 11,964,738 B2
(45) Date of Patent: Apr. 23, 2024

(54) OFFSHORE STRUCTURE, FENDER DEVICE FOR OFFSHORE STRUCTURE, AND METHOD FOR MOVING TOWARD STRUCTURAL BODY CONSTITUTING OFFSHORE STRUCTURE

(71) Applicant: Sustainable Works Corporation, Saitama (JP)

(72) Inventors: Tomonori Ishii, Saitama (JP); Tatsuya Ishibashi, Tokyo (JP); Yasuhito Iizuka, Tokyo (JP); Masahiro Tamashima, Sasebo (JP); Tomohiro Nojou, Sasebo (JP)

(73) Assignee: Sustainable Works Corporation, Saitama (JP)

( * ) Notice: Subject to any disclaimer, the term of this patent is extended or adjusted under 35 U.S.C. 154(b) by 0 days.

(21) Appl. No.: 18/034,585

(22) PCT Filed: Feb. 22, 2021

(86) PCT No.: PCT/JP2021/006677
§ 371 (c)(1),
(2) Date: Apr. 28, 2023

(87) PCT Pub. No.: WO2022/176205
PCT Pub. Date: Aug. 25, 2022

(65) Prior Publication Data
US 2024/0025520 A1    Jan. 25, 2024

(51) Int. Cl.
*B63B 59/02* (2006.01)
*B63B 35/44* (2006.01)
*F03D 13/25* (2016.01)

(52) U.S. Cl.
CPC .............. *B63B 59/02* (2013.01); *B63B 35/44* (2013.01); *B63B 2035/446* (2013.01); *F03D 13/256* (2023.08); *F05B 2240/93* (2013.01); *F05B 2240/95* (2013.01)

(58) Field of Classification Search
CPC ........ B63B 59/02; B63B 35/44; F03D 13/256
See application file for complete search history.

(56) References Cited

FOREIGN PATENT DOCUMENTS

| | | | | |
|---|---|---|---|---|
| CN | 110546064 B | * | 3/2021 | ............. B63B 17/00 |
| EP | 2270330 A1 | | 1/2011 | |
| EP | 2520485 A1 | * | 11/2012 | ............. B63B 21/00 |
| EP | 2520485 A1 | | 11/2012 | |
| GB | 2483401 A | * | 3/2012 | ........... B63B 27/143 |
| JP | 2013-233922 A | | 11/2013 | |
| JP | 2015-535772 A | | 12/2015 | |

(Continued)

*Primary Examiner* — S. Joseph Morano
*Assistant Examiner* — Jovon E Hayes
(74) *Attorney, Agent, or Firm* — Lucem, PC; Heedong Chae

(57) ABSTRACT

A base supporting an offshore wind power generator includes a fender portion composed of a pair of cylindrically shaped first fender portion and second fender portion for cushioning an impact when a ship touches the fender portion, and rung portions extending horizontally from the fender portion toward the base and composed of first rung portions and second rung portions installed at predetermined intervals in the vertical direction. A worker on board the ship can safely transfer to the adjacent rung portions when the hull of the ship kept touching the fender portion.

7 Claims, 7 Drawing Sheets

(56) References Cited

FOREIGN PATENT DOCUMENTS

| | | | | |
|---|---|---|---|---|
| JP | 2017-133431 | A | 8/2017 | |
| JP | 2020-536783 | A | 12/2020 | |
| KR | 02123077 | B1 | 6/2020 | |
| TW | 201420840 | A * | 6/2014 | ............ B63B 21/00 |
| WO | 2005097591 | A1 | 10/2005 | |
| WO | 2012066349 | A1 | 5/2012 | |
| WO | 2017217505 | A1 | 12/2017 | |

\* cited by examiner

OFFSHORE STRUCTURE, FENDER DEVICE FOR OFFSHORE STRUCTURE, AND METHOD FOR MOVING TOWARD STRUCTURAL BODY CONSTITUTING OFFSHORE STRUCTURE

TECHNICAL FIELD

The present invention relates to an offshore structure, a fender device for an offshore structure, and a method for moving toward a structural body constituting an offshore structure. More specifically, the present invention relates to an offshore structure, a fender device for an offshore structure, and a method for moving toward a structural body constituting an offshore structure that allow a worker to safely and quickly move from a ship to a structural body constituting an offshore structure even in very rough sea conditions or very strong wind conditions.

BACKGROUND ART

Out of consideration for global warming, there has been an increasing interest in power generators using clean energy. One of such power generators is a wind power generator. The wind power generator is a device that rotates blades by wind power and converts rotational energy obtained by the rotation of the blades into electrical energy.

The stronger the wind, the greater the energy that can be obtained by the wind power generator. Therefore, it is required to secure a location where wind power that enables efficient power generation can be obtained throughout the year and furthermore there is no effect on neighborhood residents such as noise, vibrations, etc. Thus, installation onshore, especially in mountainous areas, has been conventionally considered. However, it is difficult to stably maintain the power generation output in a region having mountainous weather in which the wind speed and the wind direction change rapidly, and the amount of power generated and the operating rate throughout the year are not necessarily high. Further, there is a problem that there are also restrictions on installation area and installation location in the mountainous areas and it is not possible to handle an increase in output (increase in size) of the wind power generator.

On the other hand, offshore, there is a characteristic that the wind speed is higher than onshore and a stable wind blows throughout the year. In addition, there are fewer obstacles offshore and there is also less influence of noise and radio interference, and there is a tendency that large power consumption zones are concentrated in coastal areas and other power system facilities tend to be more developed in coastal areas. As just described, offshore has advantageous conditions for wind power generation over onshore, so that the wind power generator installed offshore (hereinafter, referred to as an "offshore wind power generator") has been widely adopted in recent years.

Incidentally, the wind power generator is composed of a plurality of devices such as, mainly, blades, a main shaft for transmitting the rotation of the blades, a speed increasing gear for increasing the rotation speed of the main shaft, a brake device for controlling the rotation speed, and furthermore a power generator for converting the rotational force into electricity. Also for improving the operating rate of the wind power generator, periodic maintenance and inspection become very important so that these devices each always operate without any incident. In the offshore wind power generator described above, the challenge is to transfer a worker in charge of maintenance safely and inexpensively to the offshore wind power generator.

In an existing offshore wind power generator, as shown in FIG. 7, for example, a ladder 80 is installed on a side surface of a base 40, and a pair of fender devices 50 are installed along the ladder 80 so that a ship S does not come into contact with the ladder 80. The ship S is then touched to the fender devices 50, and part of the hull of the ship S (for example, the bow) is pressed against a cylindrical shape first fender portion 51a and a second fender portion 51b of the fender devices 50 to secure a foothold on board when the worker transfers.

However, even if the ship S presses the hull against the fender devices 50 with the bow of the ship S directed toward the ladder 80, a large gap is existing between the ship S and the ladder 80 when viewed from the worker on board the ship S. Therefore, when the worker transfers from the ship S to the ladder 80, it is necessary to leave one foot on part of the hull and put the other foot on a rung of the ladder 80 with the other foot extending to the maximum, and then to move also the one foot to the rung to complete the transfer from on board the ship S to the ladder 80.

As just described, the worker is forced into an unbalanced posture when transferring from the ship S to the ladder 80, which can even increase the burden on the worker's body. Furthermore, in the irregular movement from the ship S exhibiting erratic behavior due to influence of sea surface waves, there is also a concern that the worker may fall into the sea at the time of transfer.

Regarding the problems as described above, for example, Patent Literature 1 discloses a technique for transferring a worker to a wind power generator using an aircraft. According to Patent Literature 1, the aircraft is brought closer to the wind power generator, the aircraft and a nacelle of the wind power generator are connected by a ladder, and the worker can use the ladder to transfer from the aircraft to the power generator.

Further, Patent Literature 2 discloses a ship having a gangway through which a worker can pass. According to Patent Literature 2, by bridging the ship carrying the worker and the wind power generator installed offshore with the gangway, the worker can be safely transferred from the ship to the wind power generator.

CITATION LIST

Patent Literatures

Patent Literature 1: European Patent Application Publication No. 2270330
Patent Literature 2: Japanese Unexamined Patent Application Publication (Translation of PCT Application) No. 2020-536783

SUMMARY OF INVENTION

Technical Problems

However, with the technique of Patent Literature 1 described above, it is difficult to hover the aircraft at a predetermined position due to strong winds in the sky. Furthermore, in the case of a floating offshore wind power generator, it is always irregularly moving under the influence of waves. In such a state, a very advanced steering skill is required to install one end of the ladder at a determined given position of the offshore wind power generator from the aircraft. Further, even if the ladder can be installed on the offshore wind power generator, it is assumed that it is dangerous for the worker to move from the aircraft to the wind power generator by using the ladder in strong winds.

Further, with the technique of Patent Literature 2 described above, the worker can move more safely over the sea through the gangway. However, the gangway is a complicated device and tends to be large in size, so that the gangway can only be installed on a relatively large ship. Thus, in addition to the installation cost of the device, there is a problem that the operating cost is higher than that of a small ship such as a fishing boat.

The present invention was made taking into consideration the above points, and an object thereof is to provide an offshore structure, a fender device for an offshore structure, and a method for moving toward a structural body constituting an offshore structure that allow a worker to safely and quickly move from a ship to a structural body constituting an offshore structure even in very rough sea conditions or very strong wind conditions.

Solution to Problems

In order to achieve the above object, an offshore structure of the present invention includes a base, a structural body installed on an upper surface of the base and supported above a sea water level, and a fender device having a pair of fender portions vertically extending at positions spaced apart from the base by predetermined distances and arranged side by side at a predetermined interval and rung portions extending horizontally from the fender portions toward the base and installed at predetermined intervals in a vertical direction.

Here, by providing the base and the structural body installed on the upper surface of the base to the offshore structure, and by configuring the base to be fixed on the seabed or floated, the structural body installed on the upper surface of the base can be stably installed offshore.

Further, the fender device having the fender portions is installed on the base, so that when a ship carrying a worker who performs maintenance and inspection of the structural body accesses the offshore structure, the worker can safely transfer from the ship to the structural body by touching the ship to the fender portions.

Further, the fender portions vertically extend at positions spaced apart from the base by predetermined distances and are arranged side by side at a predetermined interval, so that part of the ship can be prevented from colliding with the base of the offshore structure or a structure installed around the base when the ship touches the fender portions.

Further, by pressing the ship against the fender portions while touching, irregular movement of the ship due to waves can be controlled to stabilize the ship. Thus, the safety of the worker when transferring from the ship to the fender device can be enhanced. By forming the fender portions with elastic members, the fender portions function as cushioning materials when the ship and the fender portions are brought into contact, and damage to the ship's hull can be reduced.

Further, by including the rung portions extending horizontally from the fender portions toward the base, the worker can safely transfer to the rung portions with the ship's hull kept touching the fender portions. Here, the rung portions extend from the fender portions toward the base, so that when the ship touches the fender portions, the ship and the rung portions have a very close positional relationship to each other. Thus, the worker can easily transfer from the ship to the rung portions without being forced into an unreasonable posture. Accordingly, the risk of the worker falling into the sea at the time of transfer or the risk of increasing the burden on the worker's body due to the unbalanced posture at the time of transfer can be reduced, and the worker can safely transfer from the ship to the rung portions.

Further, the rung portions are installed at predetermined intervals in the vertical direction, so that the worker having transferred from the ship to the rung portions can reach the structural body installed on the upper surface of the base along the fender portions while placing his/her hands and feet on the rung portions.

Further, in the case of including a guiding device composed of a first guiding pole and a second guiding pole vertically extending at positions spaced apart from the base and the fender device by predetermined distances and arranged side by side at a predetermined interval, the ship accessing the offshore structure sails toward the guiding device, and part of the hull of the ship is brought into contact with the guiding device, whereby the ship can be guided to the fender device by the reaction.

The fender portions include a first fender portion and a second fender portion. When a straight line passing through the first fender portion and the second fender portion is defined as a first imaginary straight line and a straight line passing through the first guiding pole and the second guiding pole is defined as a second imaginary straight line, in the case where, in a plan view, the first imaginary straight line and the second imaginary straight line are substantially parallel and the second imaginary straight line is more distal from the base than the first imaginary straight line, and a separation distance between the first guiding pole and the second guiding pole is set longer than a separation distance between the first fender portion and the second fender portion, the ship accessing the offshore structure can turn its hull in a direction where the fender device is located while contacting the guiding poles distal with respect to the base. Therefore, the ship can be more reliably guided to the fender device.

Further, when separation distances between the first fender portion and the first guiding pole and between the second fender portion and the second guiding pole are substantially equal and an angle formed by a line segment connecting the first fender portion and the first guiding pole and the first imaginary straight line and an angle formed by a line segment connecting the second fender portion and the second guiding pole and the first imaginary straight line are each approximately 5 degrees to 30 degrees, the ship can be more reliably guided to the fender device even when the ship accesses the offshore structure from all directions.

When the angle formed by the line segment connecting the first fender portion and the first guiding pole and the first imaginary straight line and the angle formed by the line segment connecting the second fender portion and the second guiding pole and the first imaginary straight line are each less than approximately 5 degrees, the first imaginary straight line and the second imaginary straight line have a relationship of substantially coinciding in a plan view. Therefore, the force for guiding the ship in contact with the guiding device to the fender device becomes weak, and therefore there is a possibility that the ship cannot be guided to the fender device.

Further, when the angle formed by the line segment connecting the first fender portion and the first guiding pole and the first imaginary straight line and the angle formed by the line segment connecting the second fender portion and the second guiding pole and the first imaginary straight line are each larger than approximately 30 degrees, assuming, for example, that the ship is a small ship with a gross tonnage of around 20 tons, the separation distance between the first guiding pole and the second guiding pole is relatively short with respect to the width of the ship. Therefore, not only is it difficult to bring the ship into contact with the guiding device, but also there is a possibility that the guiding device becomes a hindrance in sailing of the ship.

Further, when the structural body is a wind power generator having a tower installed on the upper surface of the base, a nacelle installed on a top portion of the tower and housing a speed increasing gear and a power generator inside, and a rotor provided at one end of the nacelle and having a hub and a plurality of blades, the worker having transferred from the ship to the rung portions can move vertically upward using with the rung portions and access the inside of the nacelle from the tower to perform maintenance and inspection of important parts constituting the wind power generator.

Further, when the upper surface of the base includes a platform on which the tower is installed and the rung portions are installed in a predetermined range from the sea water level to the platform, the worker having transferred from the ship to the rung portion can safely move using with the rung portions to the platform on which the tower is installed or to a position in proximity to the platform.

In order to achieve the above object, a fender device for an offshore structure of the present invention includes a pair of fender portions vertically extending and arranged side by side at a predetermined interval and rung portions horizontally extending from the fender portions toward a base of an offshore structure, which is a target on which the fender device is installed, and installed at predetermined intervals in the vertical direction of the fender portions.

Here, by including the pair of fender portions vertically extending and arranged side by side at a predetermined interval, part of the ship's hull can be prevented from colliding with the base of the offshore structure or a structure installed on the base when the ship touches the fender portions.

Further, the ship at the time of touching the fender portions is stabilized by pressing the ship's hull against the fender portions, so that the safety of the worker when transferring from the ship to the fender device can be enhanced. Further, by forming the fender portions with elastic members, the fender portions function as cushioning materials when the ship's hull and the fender portions are brought into contact, and damage to the ship's hull can be reduced.

Further, by including the rung portions horizontally extending from the fender portions toward the base of the offshore structure, on which the fender device is installed, and installed at predetermined intervals in the vertical direction, the worker can move vertically upward using with the rung portions while placing his/her hands and feet on the rung portions.

In order to achieve the above object, a method for moving toward a structural body constituting an offshore structure of the present invention includes a process of a ship's hull making contact with fender portions vertically extending at positions spaced apart from a base of an offshore structure by predetermined distances and arranged side by side at a predetermined interval, a process in which a worker on board the ship transfers to rung portions located closer to the seawater level among rung portions extending horizontally from the fender portions toward the base and installed at predetermined intervals in the vertical direction, and a process in which the worker moves vertically upward toward an upper surface of the base while placing his/her hands and feet on the rung portions.

Here, by including the process of touching the ship's hull to the fender portions extending in the vertical direction at positions spaced apart from the base of the offshore structure by predetermined distances, the ship carrying the worker can be made to touch in close proximity to the offshore structure. At this time, irregular movement of the hull due to waves can be controlled by strongly pressing the ship's hull against the fender portions.

Further, by including the process in which the worker on board the ship transfers to the rung portions located closer to the sea water level from among the rung portions extending horizontally from the fender portions toward the base and installed at predetermined intervals in the vertical direction, the worker on board the ship can safely transfer to the rung portions adjacent to the ship's hull while the irregular movement of the hull is controlled as described above.

Further, by including the process in which the worker moves vertically upward toward the upper surface of the base while placing his/her hands and feet on the rung portions, the worker having transferred from the ship to the rung portions can safely move using with the rung portions toward the structural body on the upper surface of the base.

Advantageous Effects of the Invention

The offshore structure, the fender device for the offshore structure, and the method for moving toward the structural body constituting the offshore structure according to the present invention allow the worker to safely and quickly move from the ship to the structural body constituting the offshore structure even in very rough sea conditions or very strong wind conditions.

DESCRIPTION OF EMBODIMENTS

Hereinafter, embodiments of the present invention will be described with reference to the drawings for understanding of the present invention. An offshore structure in the following embodiments is a generic term for a base installed offshore and a structural body installed on an upper surface of the base. Further, an offshore wind power generator will be described by way of example as the structural body, but the present invention is not limited thereto, and any building existing offshore is also in the scope of application of the present invention.

Further, in each figure, for convenience of explanation, a direction upward from the sea water level is defined as an upward direction, a direction opposite to the upward direction is defined as a downward direction, an axial direction represented by the upward direction and the downward direction is defined as a vertical direction, and an axial direction perpendicular to the vertical direction is defined as a horizontal direction, in a state where the offshore wind power generator is installed offshore.

First Embodiment

Figure 1:
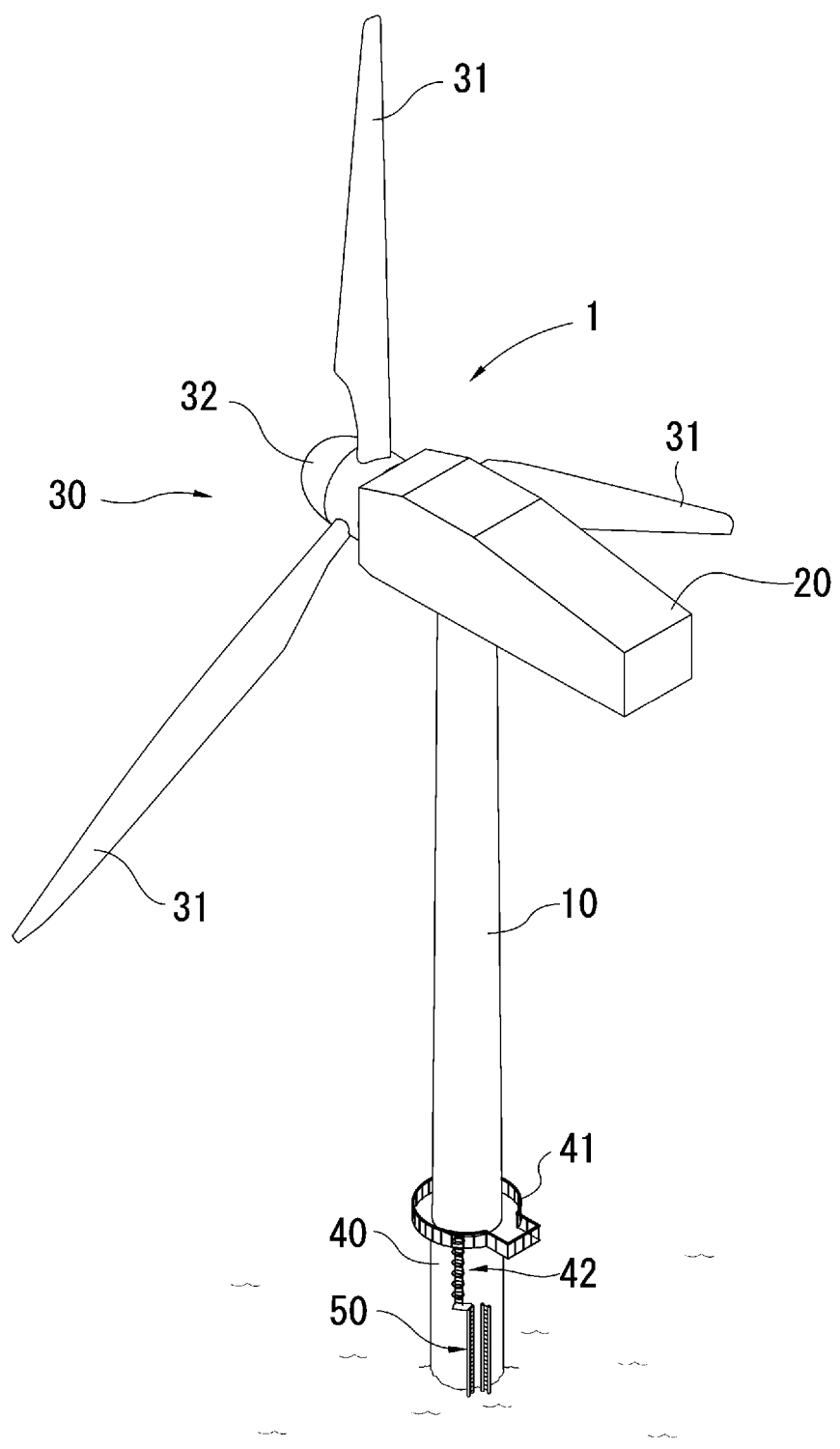
FIG. 1 is an overall external view of an offshore structure according to a first embodiment of the present invention.

First, an offshore structure according to a first embodiment of the present invention will be described. The offshore structure includes an offshore wind power generator 1, which is a structural body, on a base 40, and the offshore wind power generator 1 includes a tower 10, a nacelle 20 rotatably supported on the tower 10 and housing a speed increasing gear and a power generator (not shown), and a rotor 30 rotatably provided at one end of the nacelle 20, as shown in FIG. 1.

The rotor 30 is composed of at least one or more blades 31 (three in FIG. 1) and a hub 32, and is connected to the power generator in the nacelle 20 via a rotating shaft. When the blades 31 receive wind, the rotor 30 is rotated, and the rotational force is transmitted to the power generator, thereby generating power.

A platform 41 for a worker to access the tower 10 is installed on an upper surface of the base 40 installed on the seabed, and below the platform 41, a ladder on which the worker can move up and down is installed along a side surface of the base 40 as a passage 42 leading to the platform 41.

Here, the passage 42 leading to the platform 41 does not necessarily have to be the ladder. It is not particularly limited as long as the worker can safely move up and down. For example, linear stairs, spiral stairs, or an elevator may be installed.

Further, it does not necessarily have to include the passage 42. For example, rung portions 52 provided to a fender device 50 described later may be installed vertically up to the platform 41.

Figure 2:
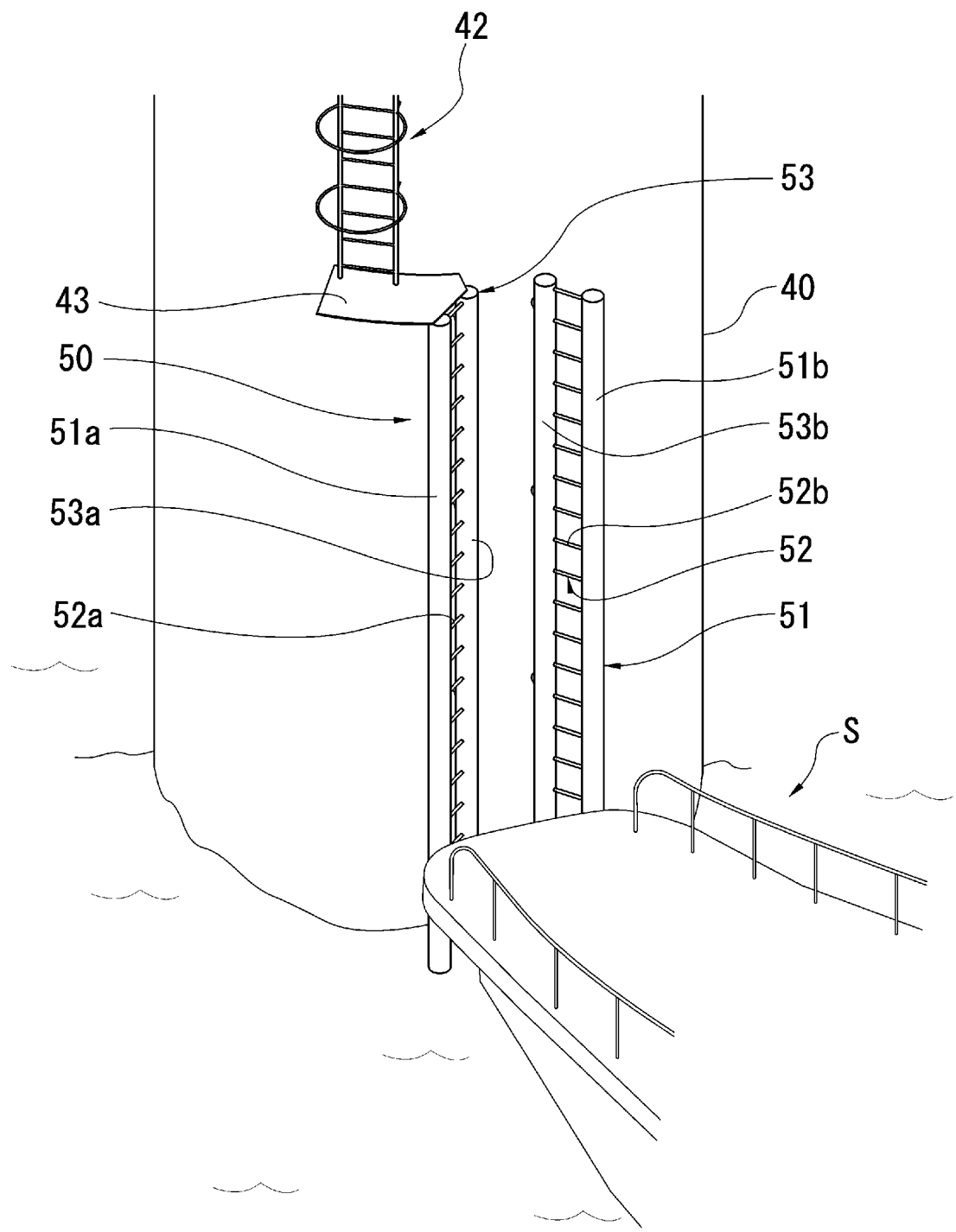
FIG. 2 is an enlarged perspective view of the offshore structure according to the first embodiment of the present invention.
Figure 3:
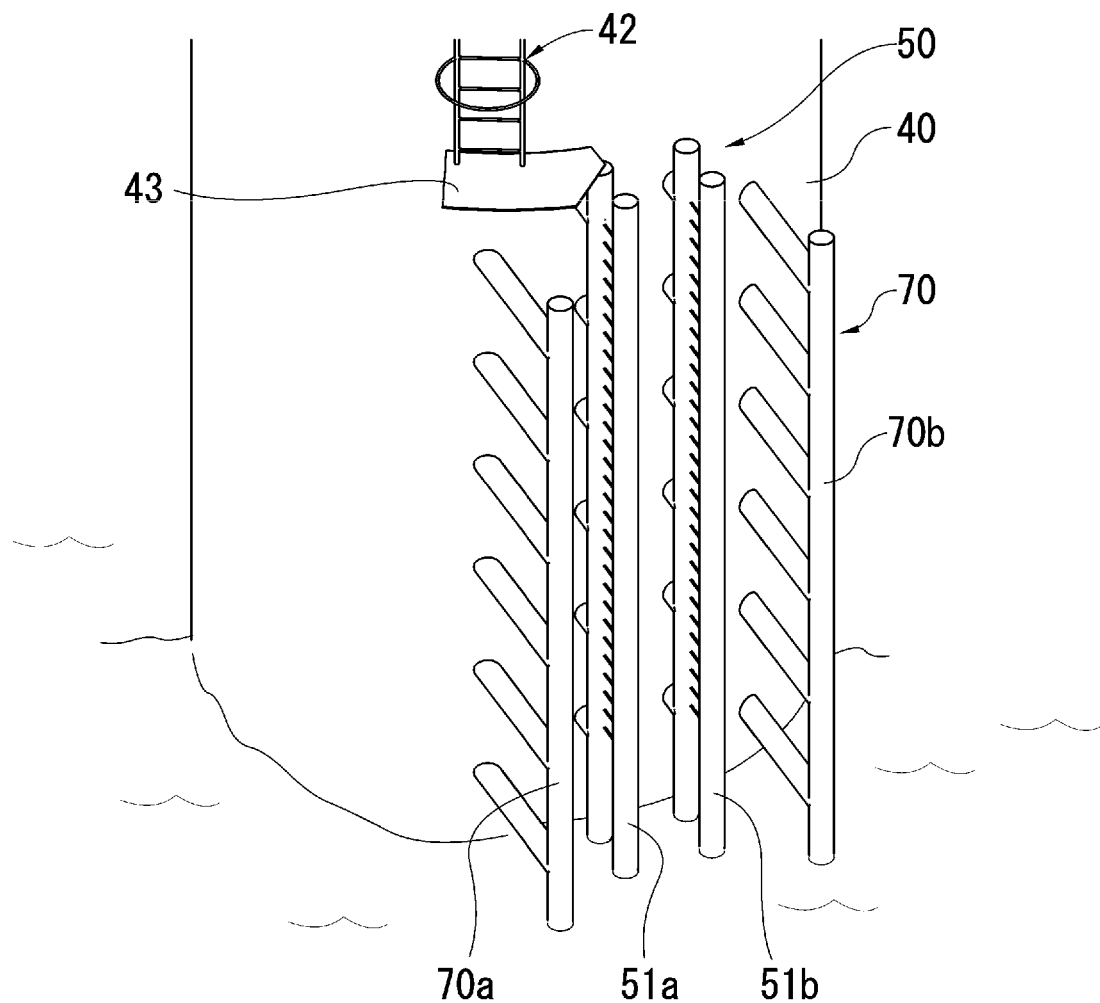
FIG. 3 is an enlarged perspective view of an offshore structure according to a second embodiment of the present invention.

Below the passage 42, there is installed a fender device 50 for cushioning an impact when a ship S, on which the worker who performs maintenance and inspection of the offshore wind power generator 1 boards, touches the base 40. The fender device 50 is composed of a fender portion 51, rung portions 52, and a strut 53. The fender portion 51 has a vertically extending cylindrical shape first fender portion 51a and second fender portion 51b arranged side by side so as to face each other. The ship S accessing the offshore structure touches the first fender portion 51a and the second fender portion 51b as shown in FIG. 2 and FIG. 3 with the ship's bow side.

Here, the fender portion 51 may be made of, for example, an elastic material so that an impact when the ship S touches is cushioned. Further, for example, the entire fender portion 51 does not necessarily have to be made of an elastic material, and an elastic material such as a cushioning material may be partially installed only on a portion which the ship S touches.

The rung portions 52 are a device for the worker to move up and down while placing his/her hands and feet thereon and are installed at predetermined intervals in the vertical direction of the fender portion 51 from near the sea water level to a stage 43 at a lower end of the passage 42. The rung portions 52 are each formed in a cylindrical shape and are composed of first rung portions 52a horizontally extending from the first fender portion 51a toward the base 40 and the second rung portions 52b horizontally extending from the second fender portion 51b toward the base 40.

Furthermore, the first rung portions 52a each have one end fixed to the first fender portion 51a and the other end fixed to a first strut 53a by well-known fixing means such as welding. Further, the second rung portions 52b each have one end fixed to the second fender portion 51b and the other end fixed to a second strut 53b respectively by well-known fixing means such as welding.

Here, the rung portion 52 does not necessarily have to be substantially cylindrical. For example, it may be configured such that the shape of the rung portion 52 which is closest to the sea water level and to which the worker first transfers is a flat plate shape but not the cylindrical shape to secure a foothold at the time of transfer.

The fender device 50 configured as above is firmly fixed to the base 40 via a support member 60. The fixing of the fender device 50 to the base 40 does not need to be made via the support member 60. For example, instead of the first strut 53a and the second strut 53b supporting the other ends of the first rung portions 52a and the second rung portions 52b, the other ends of the first rung portions 52a and the second rung portions 52b may be directly fixed to the base 40.

Further, the fender device 50 is subjected to a large load such as a load when the worker moves up and down or an impact load when the ship S touches. Therefore, in order to increase the mounting strength of the fender device 50 to the base 40, it may be configured such that the thickness of some of the rung portions 52 located at an upper, lower, or intermediate part of the fender portion 51 is partially increased.

Second Embodiment

Next, an offshore structure according to a second embodiment of the present invention will be described based on FIG. 3. In the description of the second embodiment, the same reference signs are given to the same configurations as in the first embodiment and description thereof is omitted, and only the configurations different from the first embodiment are mainly described.

In the offshore structure according to the second embodiment, there is provided a guiding device 70 for guiding the ship S to the fender device 50. The guiding device 70 has a cylindrical shape first guiding pole 70a and second guiding pole 70b vertically extending at positions distal from the fender device 50, arranged side by side so as to face each other, and fixed to the base 40.

Figure 4:
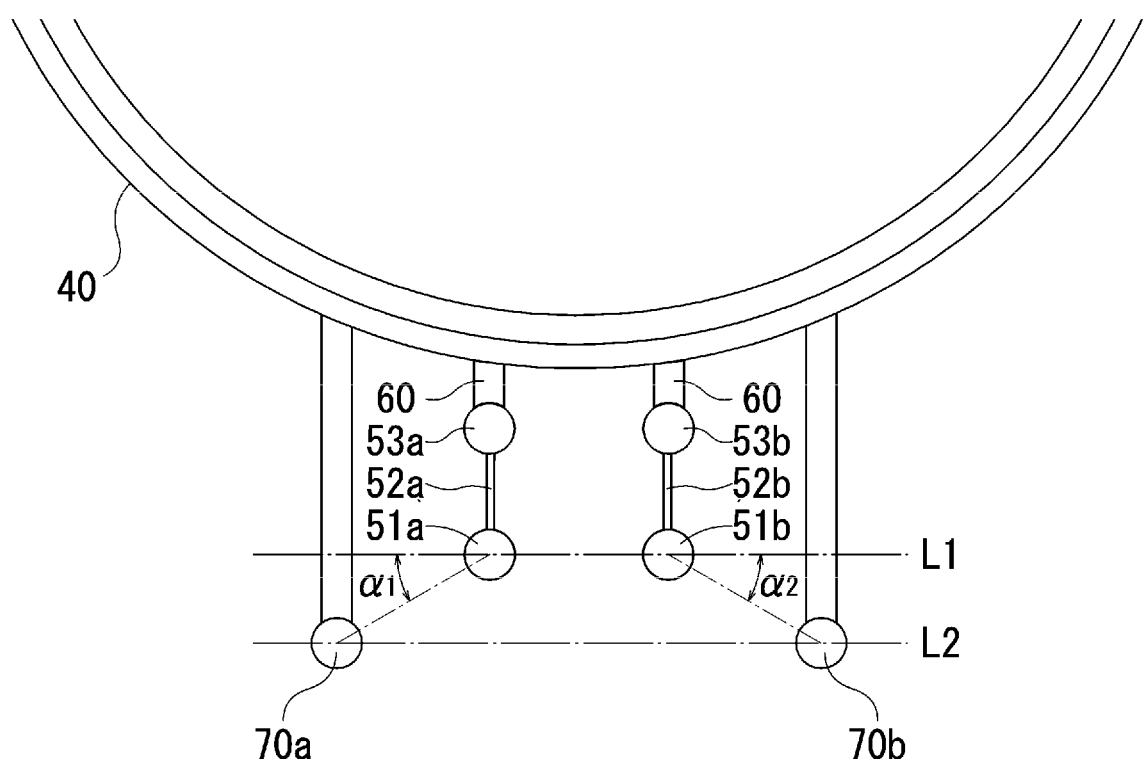
FIG. 4 is an enlarged plan view of the offshore structure according to the second embodiment of the present invention.

FIG. 4 is a plan view showing the positional relationship between the fender device 50 and the guiding device 70. A separation distance between the first guiding pole 70a and the second guiding pole 70b is set longer than a separation distance between the first fender portion 51a and the second fender portion 51b. When an imaginary straight line passing through the first fender portion 51a and the second fender portion 51b is defined as L1 and an imaginary straight line passing through the first guiding pole 70a and the second guiding pole 70b is defined as L2, L1 and L2 have a positional relationship that they are substantially parallel and L2 is more distal from the base 40 than L1.

Further, an angle α1 at which a straight line connecting the first fender portion 51a and the first guiding pole 70a intersects the imaginary straight line L1 and an angle α2 at which a straight line connecting the second fender portion 51b and the second guiding pole 70b intersects the imaginary straight line L1 are each set in a range of 5 degrees or more.

The upper limit angle of the angle α1 and the angle α2 depends on the size of the ship S, but, for example, when a small ship having a gross tonnage of around 20 tons is assumed, the separation distance between the first guiding pole 70a and the second guiding pole 70b needs to be sufficiently secured with respect to the width of the small ship. In consideration of this point, the upper limit angle of the angle α1 and the angle α2 is preferably about 30 degrees, for example.

From the above, when the ship S carrying the worker accesses the offshore wind power generator 1, the ship S sails with the guiding device 70 as a target, part of the hull of the ship S is brought into contact with the guiding device 70, and then the ship S can be guided toward the direction of the fender device 50 by the reaction force at the time of contact. As a result, even when the steering of the ship S is difficult due to, for example, the influence of waves or strong winds, the ship S can touch a predetermined position of the fender device 50 in a short time.

When the angle α1 and the angle α2 described above are less than 5 degrees, the first guiding pole 70a and the second guiding pole 70b are on the imaginary straight line L1 or extremely come close to the imaginary straight line L1. Therefore, when the hull of the ship S comes into contact with the guiding device 70, the force acting in the direction of the fender device 50 of the ship S is weakened, and there is a possibility that the ship S cannot be guided toward the fender device 50.

Further, when the angle α1 and the angle α2 described above are larger than 30 degrees, assuming a ship having a gross tonnage of around 20 tons, the separation distance between the first guiding pole 70a and the second guiding pole 70b becomes relatively short with respect to the width of the ship. Therefore, not only is it difficult to bring the ship S into contact with the guiding device 70, but also there is a possibility that the guiding device 70 becomes a hindrance in sailing of the ship S.

Next, a method for moving toward a structural body constituting an offshore structure according to an embodiment of the present invention will be described. In the following description, the description is given on the premise that the worker onboard the ship S transfers to the first rung portions 52a to which the stage 43 of the passage 42 is connected from among the rung first rung portions 52a and the second rung portions 52b.

<Process 1>

After the ship S, on which the worker boards accesses close to the offshore wind power generator 1, part of the hull of the ship S touches the fender portion 51 installed on the base 40. A method of touching the fender portion 51 by the ship S is not particularly limited, but for example, the bow of the hull of the ship S is directed in the direction of the base 40, and the hull of the ship S touches in such a manner as to be pressed against the fender portion 51.

<Process 2>

After the ship S completes touching the fender portion 51 and the irregular movement of the ship S due to waves is controlled, the worker transfers from the ship S to the first rung portions 52a. At this time, the hull and the first rung portions 52a are in a relatively close positional relationship, so that the worker has no risk of falling into the sea and can safely transfer from the ship S to the first rung portions 52a without being forced into an unbalanced posture.

<Process 3>

After the worker can transfer to the first rung portions 52a, the worker moves vertically upward until reaching the stage 43 at the lower end of the passage 42 while placing his/her hands and feet on the first rung portions 52a installed in the vertical direction.

<Process 4>

When having accessed up to the stage 43, the worker moves through the passage 42 to the platform 41 where the tower is located. The worker having accessed the platform 41 moves to the nacelle 20 by lifting means (not shown) installed inside the tower and performs maintenance and inspection of the devices housed in the nacelle 20 or the rotor 30.

Through the above processes, the worker can quickly and safely access the platform 41 from the ship S.

(Modification 1)

It is noted that the present invention is not limited to the embodiments described above and various modifications can be adopted within the scope of the present invention as shown below.

Figure 5:
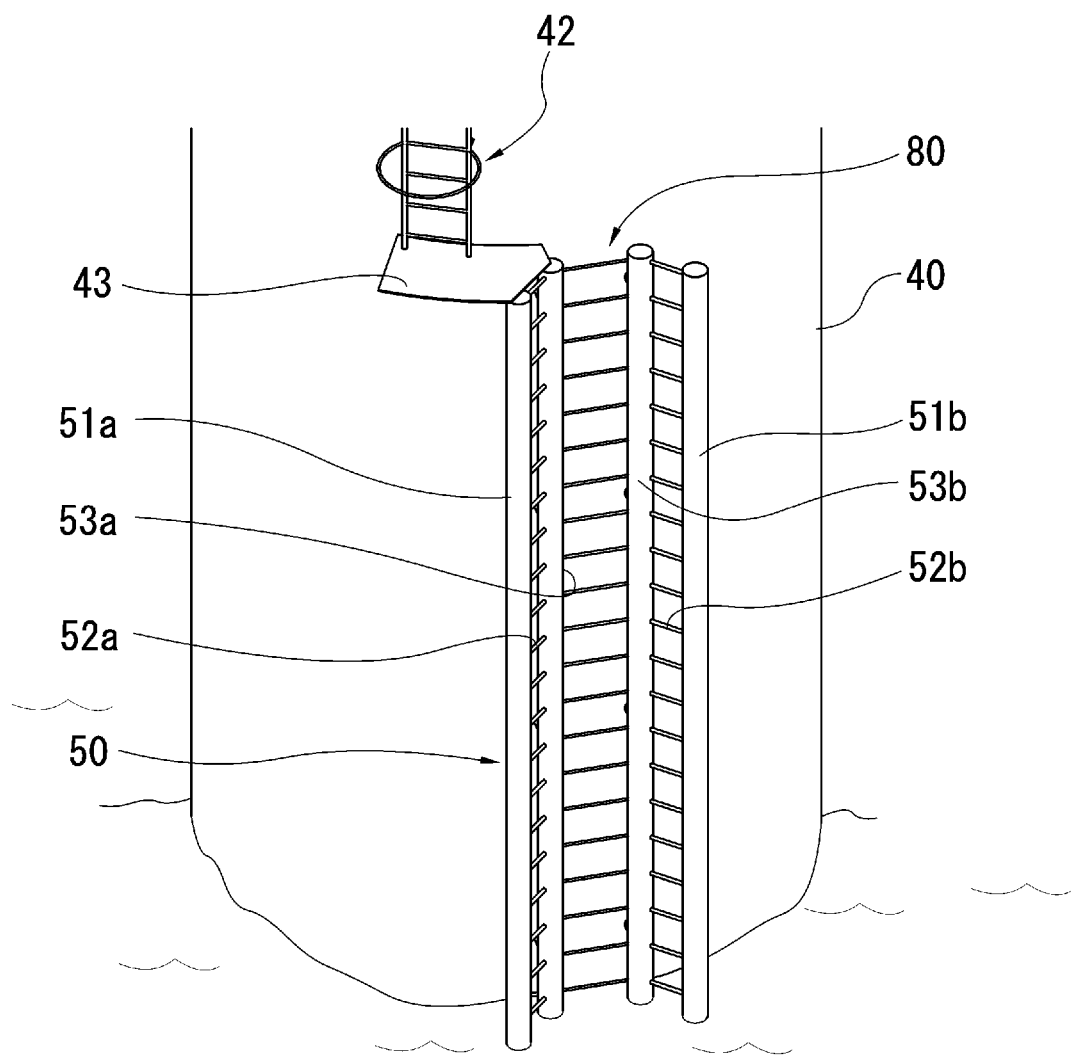
FIG. 5 is a view showing Modification 1 of the present invention.
Figure 6:
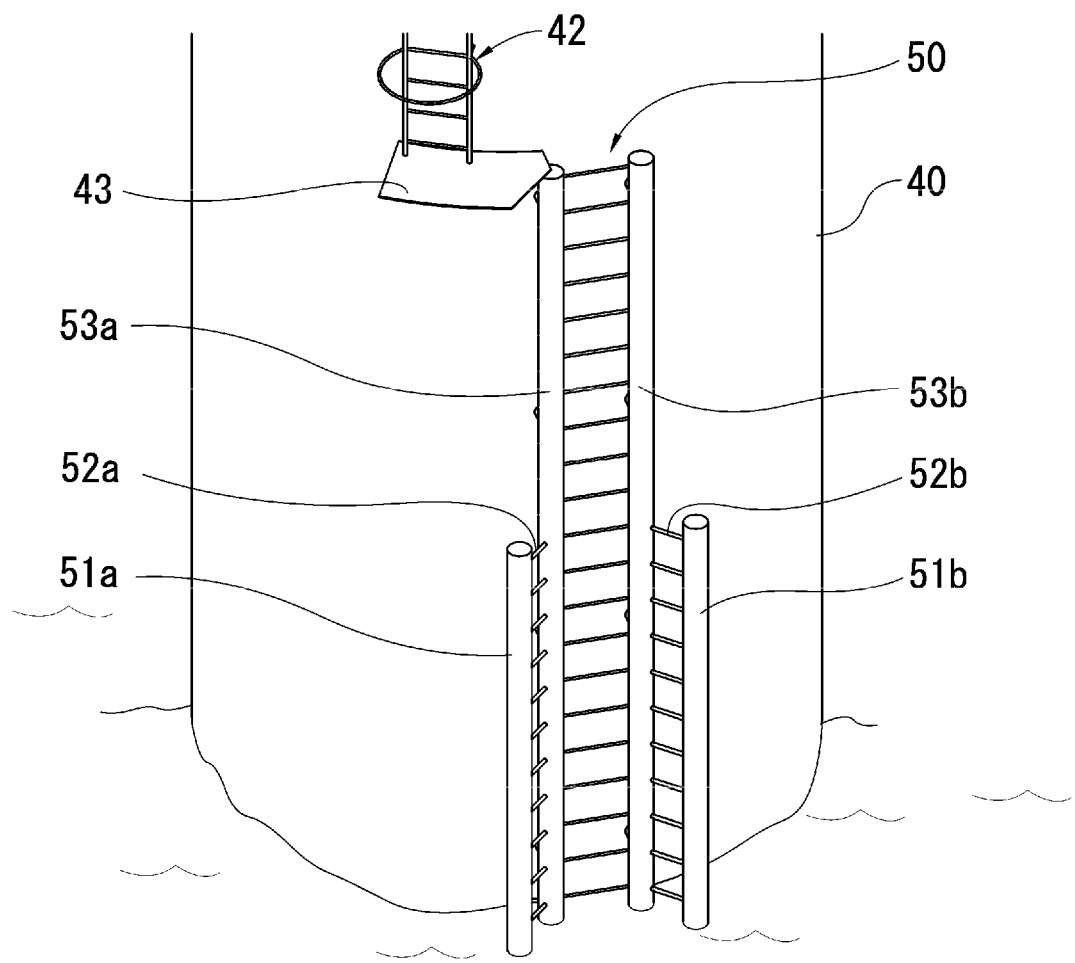
FIG. 6 is a view showing Modification 2 of the present invention.
Figure 7:
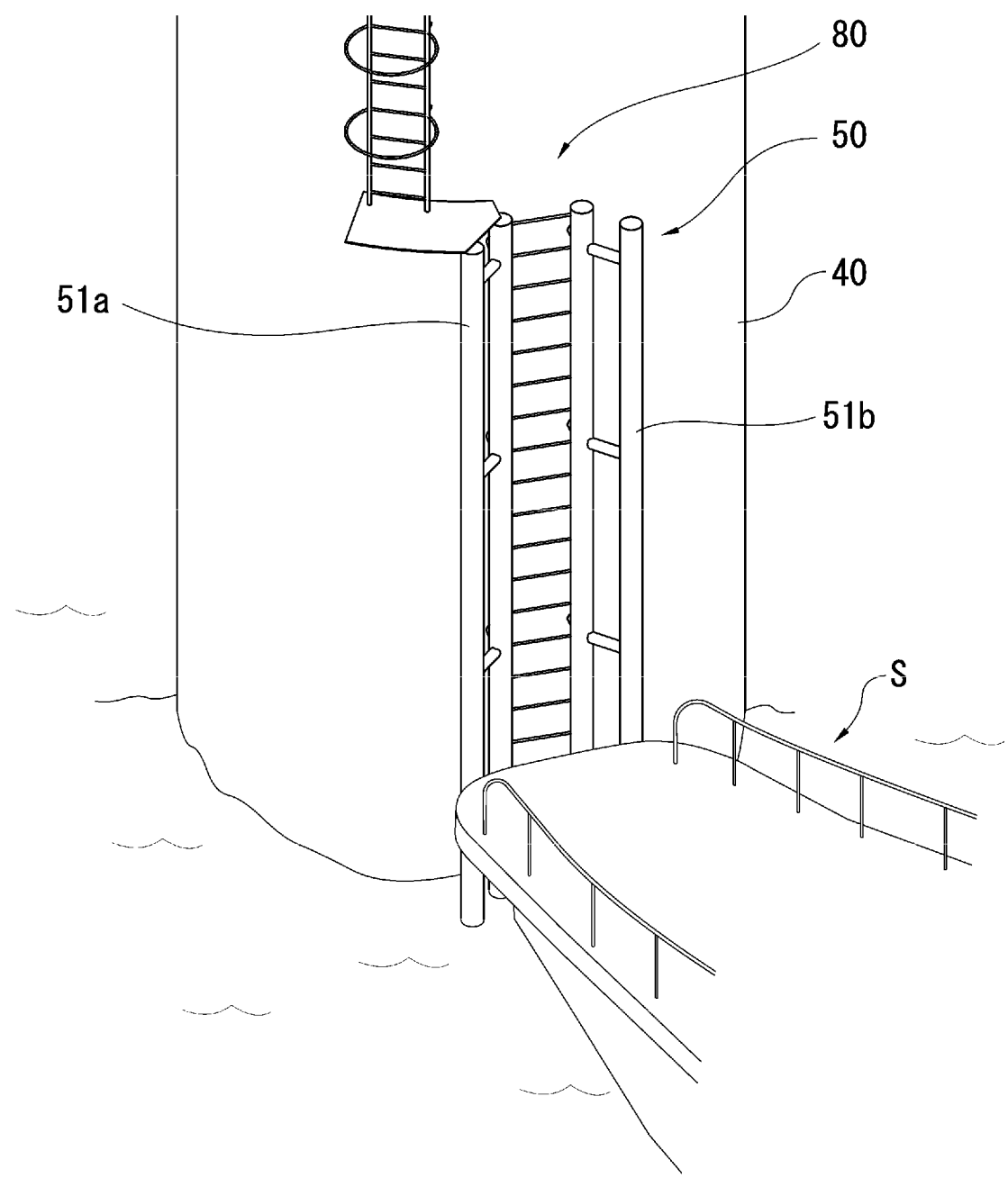
FIG. 7 is an enlarged perspective view of a conventional offshore structure.

For example, with respect to the conventional structure shown in FIG. 7, it may be configured such that the first rung portions 52a and the second rung portions 52b are installed between the first fender portion 51a, the second fender portion 51b, and the struts of the ladder 80 as shown in FIG. 5. According to this, the fender device 50 can be configured at low cost while using the installed existing fender device 50 and ladder 80.

(Modification 2)

Further, with respect to Modification 1, it may be configured such that the height of the fender portion 51 is limited, the worker moves up to a predetermined height from the sea water level by the rung portions 52 installed in the fender portion 51, and then, the worker moves from the upper end of the fender portion 51 to the stage 43 using the ladder installed on the base 40.

As described above, the offshore structure, the fender device for the offshore structure, the method for moving toward the structural body constituting the offshore structure according to the present invention allow the worker to safely and quickly move from the ship to the structural body constituting the offshore structure even in very rough sea conditions or very strong wind conditions.

REFERENCE SIGNS LIST

1 Offshore wind power generator
10 Tower
20 Nacelle
30 Rotor
31 Blade
32 Hub
40 Base
41 Platform
42 Passage
43 Stage
50 Fender device
51 Fender portion
51a First fender portion
51b Second fender portion
52 Rung portion
52a First rung portion
52b Second rung portion
53 Strut
53a First strut
53b Second strut 60 Support member
70 Guiding device
70a First guiding pole
70b Second guiding pole
80 Ladder
L1 First imaginary straight line
L2 Second imaginary straight line
S Ship

The invention claimed is:

1. An offshore structure comprising:
a base;
a structural body installed on an upper surface of the base and supported above a sea water level; and
a fender device having a pair of fender portions vertically extending at positions spaced apart from the base by predetermined distances and arranged side by side at a predetermined interval, and rung portions for a person to move up and down the rung portions while placing his/her hands and feet thereon,
wherein the rung portions extend horizontally from the fender portions toward the base and are installed at predetermined intervals in a vertical direction,
wherein the fender portions are constructed to allow part of a ship's hull to make contact with them.

2. The offshore structure according to claim 1, further comprising a guiding device composed of a first guiding pole and a second guiding pole vertically extending at positions spaced apart from the base and the fender device by predetermined distances and arranged side by side at a predetermined interval,
wherein the fender portions include a first fender portion and a second fender portion,
wherein a straight line passing through the first fender portion and the second fender portion is defined as a first imaginary straight line and a straight line passing through the first guiding pole and the second guiding pole is defined as a second imaginary straight line,
wherein in a plan view, the first imaginary straight line and the second imaginary straight line are substantially parallel, the second imaginary straight line is more distal from the base than the first imaginary straight line, and a separation distance between the first guiding pole and the second guiding pole is set longer than a separation distance between the first fender portion and the second fender portion.

3. The offshore structure according to claim 2, wherein a separation distance between the first fender portion and the first guiding pole and a separation distance between the second fender portion and the second guiding pole are substantially equal, and
an angle formed by a line segment connecting the first fender portion and the first guiding pole and the first imaginary straight line and an angle formed by a line segment connecting the second fender portion and the second guiding pole and the first imaginary straight line are each 5 degrees to 30 degrees.

4. The offshore structure according to claim 1, wherein the structural body is a wind power generator including:
a tower installed on the upper surface of the base;
a nacelle installed on a top portion of the tower and housing a speed increasing gear and a power generator inside; and
a rotor provided at one end of the nacelle and having a hub and a plurality of blades.

5. The offshore structure according to claim 3, wherein the upper surface of the base includes a platform on which a tower is installed, and
the rung portions are installed in a predetermined range from the sea water level to the platform.

6. A fender device for an offshore structure, comprising:
fender portions vertically extending and arranged side by side at a predetermined interval; and
rung portions for a person to move up and down the rung portions while placing his/her hands and feet thereon,
wherein the rung portions horizontally extend from the fender portions toward a base of the offshore structure, which is a target on which the fender device is installed, and are installed at predetermined intervals in the vertical direction of the fender portions,
wherein the fender portions are constructed to allow part of a ship's hull to make contact with them.

7. A method for moving toward a structural body of an offshore structure, comprising the steps of:
part of a ship's hull making contact with fender portions that vertically extend at positions spaced apart from a base of the offshore structure by predetermined distances;
a worker on board the ship transferring to rung portions located closer to a sea water level among rung portions that extend horizontally from the fender portions toward the base and are installed at predetermined intervals in the vertical direction of the fender portions to allow the worker to move up and down the rung portions; and
the worker moving vertically upward toward an upper surface of the base while placing his/her hands and feet on the rung portions.

* * * * *